United States Patent
Vogt

(10) Patent No.: US 9,368,007 B2
(45) Date of Patent: Jun. 14, 2016

(54) METHODS AND SYSTEMS FOR DETERMINING A LOCATION OF A CONTAINER

(71) Applicant: eProvenance, LLC, Belmont, MA (US)

(72) Inventor: Eric Vogt, Belmont, MA (US)

(73) Assignee: eProvenance, LLC, Belmont, MA (US)

( * ) Notice: Subject to any disclaimer, the term of this patent is extended or adjusted under 35 U.S.C. 154(b) by 217 days.

(21) Appl. No.: 14/026,720

(22) Filed: Sep. 13, 2013

(65) Prior Publication Data

US 2014/0009290 A1 Jan. 9, 2014

Related U.S. Application Data

(63) Continuation of application No. PCT/US2012/029491, filed on Mar. 16, 2012.

(60) Provisional application No. 61/453,794, filed on Mar. 17, 2011.

(51) Int. Cl.
*G08B 13/02* (2006.01)
*G06Q 10/08* (2012.01)

(52) U.S. Cl.
CPC ............ *G08B 13/02* (2013.01); *G06Q 10/0833* (2013.01)

(58) Field of Classification Search
CPC . G06Q 10/0833; G06Q 20/341; G08B 13/02; H04L 67/18; H04L 67/22; H04M 1/72552; H04W 4/02; H04W 4/14
USPC ................ 340/8.1, 539.32, 568.1; 455/404.2, 455/456.1, 466, 558
See application file for complete search history.

(56) References Cited

U.S. PATENT DOCUMENTS

| | | | |
|---|---|---|---|
| 6,656,135 B2 | 12/2003 | Zogbi et al. | |
| 6,751,969 B1 | 6/2004 | Moran et al. | |
| 7,538,681 B1* | 5/2009 | Sharma | G06K 7/0008 235/375 |
| 8,456,302 B2* | 6/2013 | Stevens | 340/539.31 |
| 8,514,756 B1* | 8/2013 | Ramachandra | H04L 61/2069 370/310 |
| 2004/0215532 A1 | 10/2004 | Boman et al. | |
| 2005/0046567 A1* | 3/2005 | Mortenson | G06Q 10/047 340/539.13 |
| 2008/0052044 A1* | 2/2008 | Shoenfeld | E05B 65/52 702/188 |

(Continued)

OTHER PUBLICATIONS

Extended European Search Report on 12757404.4 dated Mar. 6, 2015.

(Continued)

*Primary Examiner* — Fekadeselassie Girma
*Assistant Examiner* — Stephen Burgdorf
(74) *Attorney, Agent, or Firm* — John D. Lanza; Foley & Lardner LLP

(57) ABSTRACT

Systems and methods of securing chattels are provided. Motion of a first container can be measured by a sensor over an interval of time and compared to motion of a second container. A relative difference between the motion of the first container and the motion of the second container over the interval of time can be calculated by a data processing circuit. A determination can be made by the data processing circuit that the relative difference in motion of the containers exceeds a predetermined threshold. An alert that the threshold has been exceeded can be transmitted by a transmitting circuit to a remote server. A SIM card and a modem can be associated with a container. Information corresponding to the location and identification of the SIM card can be received by the modem. The location and identification information can be transmitted by the modem to a remote server.

9 Claims, 9 Drawing Sheets

(56) References Cited

U.S. PATENT DOCUMENTS

| | | |
|---|---|---|
| 2008/0120201 A1 | 5/2008 | Velazquez et al. |
| 2008/0294302 A1 | 11/2008 | Basir |
| 2009/0043501 A1* | 2/2009 | Lohi et al. ............. 701/213 |
| 2009/0227270 A1 | 9/2009 | Naaman |
| 2010/0130229 A1 | 5/2010 | Sridhara et al. |
| 2010/0214092 A1 | 8/2010 | Mauro et al. |
| 2010/0216427 A1* | 8/2010 | Poranen ............. 455/410 |
| 2012/0101952 A1* | 4/2012 | Raleigh ............. G06Q 30/016 705/304 |
| 2013/0005368 A1* | 1/2013 | Hunziker ............. 455/466 |
| 2014/0197944 A1* | 7/2014 | Felgate et al. ............. 340/539.1 |

OTHER PUBLICATIONS

International Preliminary Report on Patentability on PCT/US2012/029491 dated Apr. 3, 2014.

New Zealand First Examination Report on 616724 dated Apr. 29, 2014.

International Search Report & Written Opinion on PCT/US2012/029491 dated Jun. 20, 2012.

\* cited by examiner

METHODS AND SYSTEMS FOR DETERMINING A LOCATION OF A CONTAINER

CROSS-REFERENCE TO RELATED APPLICATION

This application is a continuation of PCT International Application Number PCT/PCT/US2012/029491, filed Mar. 16, 2012, which claims priority from prior provisional application 61/453,794, filed on Mar. 17, 2011. The entire contents of the foregoing applications are hereby incorporated herein by reference.

BACKGROUND OF THE INVENTION

Producers and manufacturers of many products have an interest in ensuring that goods are handled properly during their progress through a supply chain. Some products are very sensitive to environmental conditions and can be easily damaged or destroyed during shipment before reaching consumers. It can be difficult for a manufacturer to discover the level of care with which products are transported. Furthermore, products can be lost or stolen at various points in a distribution channel. Typically, manufacturers have no way to determine how goods were lost during a shipment. Therefore it is desirable to increase the transparency of the shipping process by allowing manufacturers to track the environmental conditions and locations of goods held in inventory or during shipment.

BRIEF SUMMARY OF THE INVENTION

At least one aspect is directed to a method of determining that a relative difference in motion of at least two containers in a shipment exceeds a predetermined threshold. The method measures, by a computing device fixed to a first container, motion of the first container over an interval of time. The method receives, by the computing device, information corresponding to motion of a second container over the interval of time. The method calculates, by the computing device, a relative difference between the motion of the first container and the motion of the second container over the interval of time. The method determines that the calculated relative difference in motion of the containers exceeds a predetermined threshold, and transmits an alert responsive to the determination.

At least one aspect is directed to a system for detecting that a relative difference in motion of at least two containers in a shipment exceeds a predetermined threshold. The system includes a sensor measuring motion of a first container over an interval of time. The system includes a receiving circuit receiving information corresponding to motion of a second container over the interval of time. The system also includes a data processing circuit. The data processing circuit calculates a relative difference between the motion of the first container and the motion of the second container over the interval of time and determines that the relative difference in motion of the containers exceeds a predetermined threshold, based on the calculated relative difference in motion of the containers. The system also includes a transmitting circuit to transmit to a remote server information corresponding to an alert that the calculated difference exceeds the predetermined threshold, responsive to the determination.

At least one aspect is directed toward a method for determining a location of a container by tracking the location of a subscriber identity module (SIM) card associated with the container. The method receives, by a modem associated with the container and in communication with the SIM card, information corresponding to the location of the SIM card. The method retrieves, by the modem, information from the SIM card identifying the SIM card. The method transmits, by the modem, the location, environmental conditions, and identification information of the SIM card to a remote server via short message service (SMS).

At least one aspect is directed toward a system for determining the location of a container. The system includes a SIM card associated with the container. The SIM card stores information identifying the SIM card. The system also includes a modem associated with the container and in communication with the SIM card. The modem receives information corresponding to the location of the SIM card, retrieves the information identifying the SIM card, and transmits the location and identification information to a remote server via short message service (SMS).

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1A:
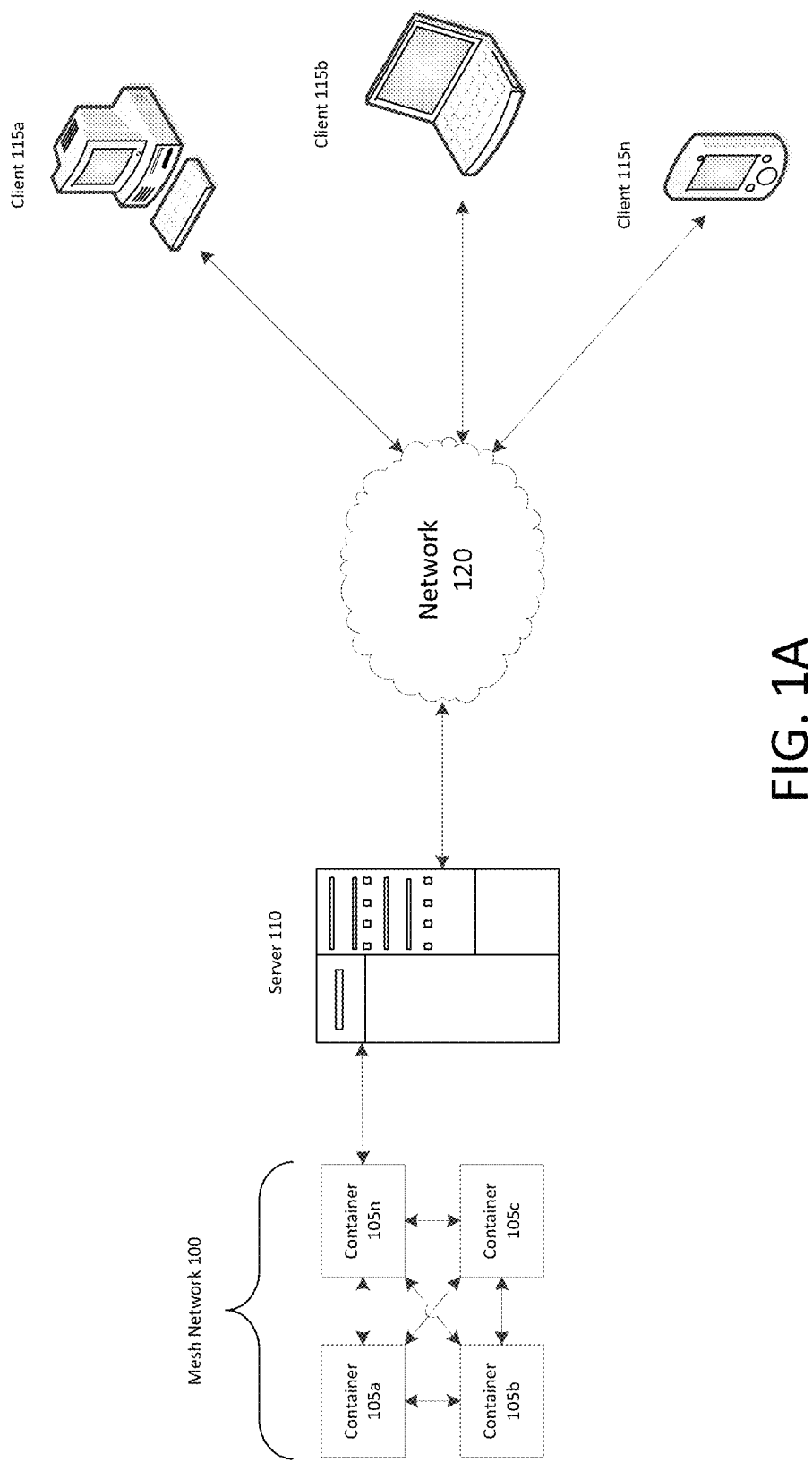
FIG. 1A is a block diagram depicting an embodiment of a network environment for determining that a relative difference in motion of at least two containers exceeds a predetermined threshold.

Referring now to FIG. 1A, an embodiment of a network environment is depicted. In brief overview, the environment includes a mesh network 100 comprising two or more containers 105a-105n in communication with a server 110. The server 110 communicates with client machines 115a-115n, via a network 120.

The server 110 and the clients 115 may be geographically dispersed from each other and may communicate over a network 120. The network 120 can be a local-area network (LAN), such as a company Intranet, a metropolitan area network (MAN), or a wide area network (WAN), such as the Internet or the World Wide Web. The network 120 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 120 may comprise a wireless link, such as an infrared channel or satellite band. The topology of the network 120 may be a bus, star, or ring network topology. The network 120 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In one embodiment, the server communicates with the clients via SMS. In some embodiments, different types of data may be transmitted via different protocols. In other embodiments, the same types of data may be transmitted via different protocols.

The server 110 may be referred to as a file server, application server, web server, proxy server, or gateway server. In one embodiment, the server 110 provides functionality of a web server. In some embodiments, the web server 110 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash. or the WebLogic Server products provided by Oracle Corporation of Redwood City, Calif.

The clients 115 may be referred to as client nodes, client machines, endpoint nodes, or endpoints. A client 115 may execute, operate or otherwise provide an application, which can be any type and/or form of software, program, or executable instructions such as any type and/or form of web browser, web-based client, client-server application, an ActiveX control, or a Java applet, or any other type and/or form of executable instructions capable of executing on client 115. The application can use any type of protocol and it can be, for example, an HTTP client, an FTP client, an Oscar client, or a Telnet client. In some embodiments a client 115 may be laptop or desktop computers executing a web browser to display information received from the server 110. In other implementations, a client 115 may be a handheld computing device such as a tablet or smartphone. For example, the client can be a mobile phone receiving information from the server 110 via short message service (SMS).

The client 115 and server 110 may be deployed as and/or executed on any type and form of computing device, such as a computer, network device or appliance capable of communicating on any type and form of network and performing the operations described herein. In some implementations, a client 115 may query the server 110 for information. In other implementations, information from the server 110 is pushed to the client 115 in the absence of a request from the client 115.

The mesh network 100 depicted in FIG. 1A includes two or more containers 105a-105n in communication with each other and with the server 110. The containers 105a-105n may be any type of container used for shipping, storing, or transporting goods. Any number of the containers 105a-105n in a shipment may be grouped together (e.g. stacked on a pallet for transport) or may be less closely associated with each other (e.g. stored in the same warehouse or loaded onto a vehicle for shipment). Each container 105 can communicate with any number of other containers 105a-105n in the shipment. In one embodiment, a container 105 can communicate with any other container 105 located within a predetermined distance of the first container 105. The containers 105a-105n may communicate using any wired or wireless protocol or protocols, including AMPS, TDMA, CDMA, GSM, GPRS or UMTS. In some embodiments, different types of data may be transmitted via different protocols. In other embodiments, the same types of data may be transmitted via different protocols.

A container 105 may transmit information corresponding to its motion, location, temperature, or humidity to any other container 105 in the shipment. In some embodiments, this information is transmitted from each container 105 at regular intervals. A container 105 may also transmit information corresponding to an alert that its motion over an interval of time exceeds a predetermined threshold relative to the motion of another container 105 in the shipment.

In addition to communicating with other containers 105a-105n, a container 105 can communicate with the server 110. In some embodiments, only a subset of the containers 105a-105n in a shipment is capable of communicating with the server 110. After receiving information from a second container 105b, a first container 105a can then retransmit the information about the second container 105b to other containers 105a-105n in the shipment. The information transmitted from a container 105 to the server 110 can also include information about any of the other containers 105a-105n in the shipment. If the communication functionality of a single container 105 fails, the network 100 of containers 105a-105n can still communicate information associated with the remaining containers 105a-105n to the server 110. This may be described as a mesh network architecture, and results in a high probability of successful communication between the containers 105a-105n and the server 110.

Figure 1B:
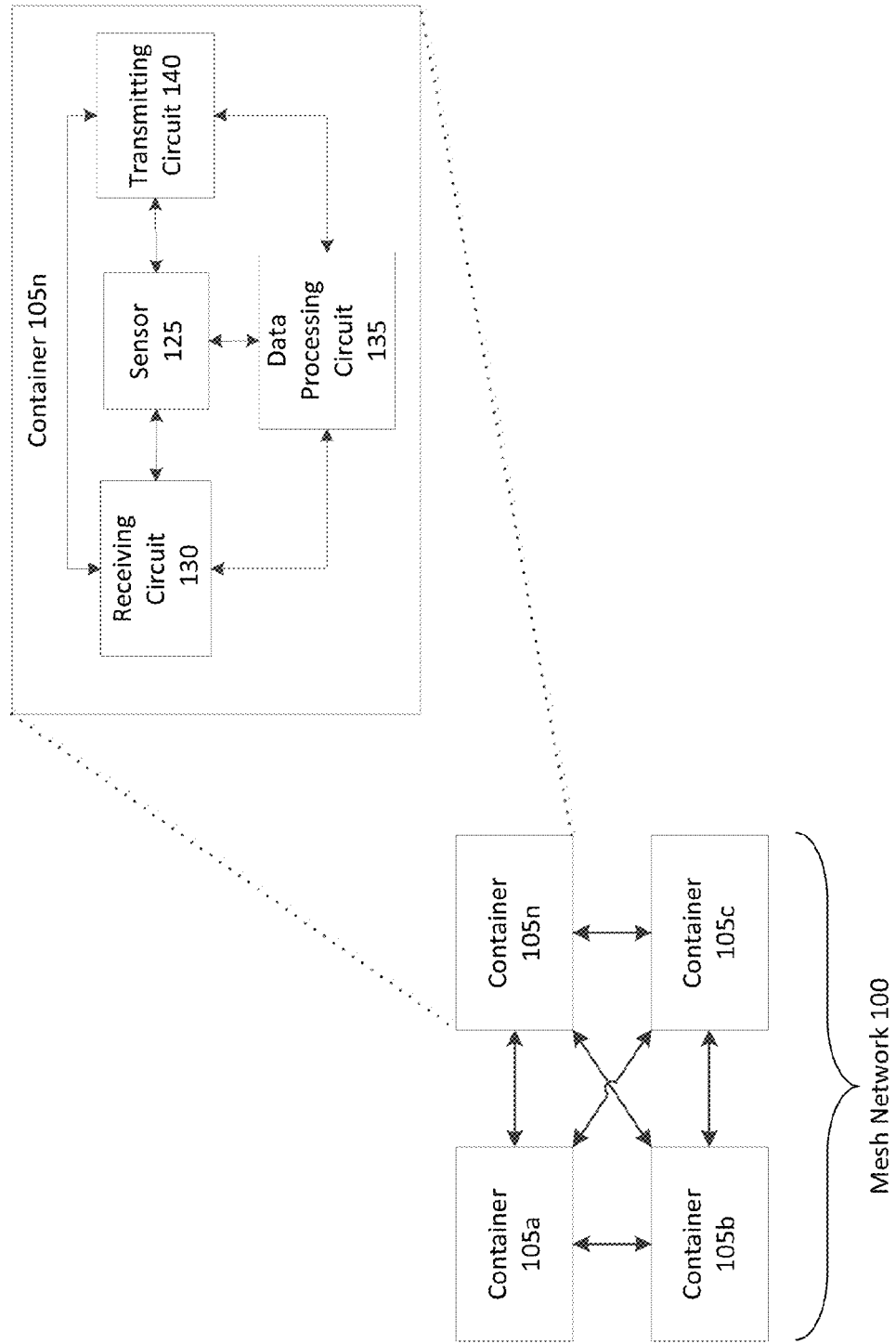
FIG. 1B is an expanded view of a system allowing one container in a shipment to determine relative differences in motion between itself and other containers in the shipment, and transmit this information to a remote server.

Referring now to FIG. 1B, an expanded view depicts one embodiment of a system for detecting that a relative difference in motion of at least two containers 105a-105n in a shipment exceeds a predetermined threshold. In brief overview, the system can include a sensor 125, a receiving circuit 130, a data processing circuit 135, and a transmitting circuit 140.

Still referring to FIG. 1B, and in greater detail, an expanded view of a system associated with a container 105 is shown. Each container 105 can include the system shown in FIG. 1B. In one implementation, the system includes a sensor 125 for measuring the motion of its associated container 105 over an interval of time. The sensor 125 can be mounted to a fixed location on or inside the container 105 so that the motion of the sensor 125 is substantially the same as the motion of the container 105. The sensor 125 can measure motion by measuring changes in location, velocity, or acceleration of the container 105. In one implementation, the sensor 125 is an accelerometer fixed to the container 105. The accelerometer can measure the acceleration of the container and can determine the motion difference by computing an integral of the measured acceleration data over the time interval. In other implementations, the sensor 125 can be a global positioning system (GPS) processor. The GPS processor can receive location information from GPS satellites over the time interval, and can compute motion by comparing its coordinates at the beginning of the interval to its coordinates at the end of the interval.

The interval of time over which the sensor 125 measures motion of the container 105 can be of any duration. In some implementations, the duration of the interval can be determined prior to the beginning of the shipment of the containers 105a-105n. For example, a manufacturer whose goods are to be shipped in the containers 105a-105n can select a value for the time interval before the goods are shipped. In one implementation, the system of FIG. 1B can be programmed directly by the manufacturer while the containers 105a-105n are still in the possession of the manufacturer. In another example, the a value specifying the duration of the time interval can be sent remotely to the system of FIG. 1B. For example, the receiving circuit 130 could receive a value for the time interval via a wireless transmission.

During the time interval, the sensor 125 measures the motion of container 105 in three spatial dimensions. In some implementations, the sensor 125 measures the motion continuously over the time interval. In other implementations, the sensor 125 can measure the total change in motion as the difference between its location at the end of the time interval and its location at the beginning of the time interval.

The system of container 105 can also include a receiving circuit 130 to receive information corresponding to motion of a second container 105b over the interval of time. The receiving circuit 130 can receive motion information from a second container 105b via any wired or wireless communication protocol. The interval of time for which the receiving circuit 130 receives motion information from a second container 105b is the same interval for which the sensor 125 measures the motion of the first container 105. In some implementations, the receiving circuit 130 can receive motion information from more than one of the other containers 105a-105n.

The system can also include a data processing circuit 135. The data processing circuit 135 can calculate a relative difference between the motion of the container 105 and the motion of a second container 105b. The difference calculation executed by the data processing circuit 135 can be accomplished by a performing a comparison operation on the motion information from the container 105 and the second container 105a.

The data processing circuit 135 can be implemented by any device suitable for processing data. For example, the data processing circuit 135 can be any kind of logic circuitry, such a field programmable gate array (FPGA), and application specific integrated circuit (ASIC), a programmable computer, or a system on a chip. In some implementations, the data processing circuit 135 can include a microprocessor, such as those manufactured by Intel Corporation of Mountain View, Calif. or those manufactured by Motorola Corporation of Schaumburg, Ill.

The data processing circuit 135 can communicate with the sensor 125 and the receiving circuit 130 to receive the motion information for the first container 105 and the second container 105b. In one implementation, the system can receive motion information from two or more other containers 105a-105n. In this example, the data processing system can calculate the difference in motion between any of the containers 105a-105n for which motion data is available.

The data processing circuit 135 can determine that a relative difference in motion of the containers 105a-105n exceeds a predetermined threshold. After the relative difference is calculated, the data processing circuit 135 can compare the difference to a maximum allowable value. For example, the containers 105a-105n can be loaded onto a vehicle for shipment. The motion threshold can be such that the containers 105a-105n may remain on the vehicle while moving relative to each other during shipment. A theft of one of the containers 105a-105n requires the difference in motion of the stolen container 105 relative to the motion of the other containers 105a-105n to exceed the threshold, and the data processing circuit 135 can determine that the threshold has been exceeded.

The system can also include a transmitting circuit 140 for transmitting information corresponding to an alert that the motion difference calculated by the data processing circuit 135 exceeds a predetermined threshold. Additional information can be included with the alert, such as information identifying the containers 105a-105n whose motion difference triggered the alert, or information about other characteristics of the containers 105a-105n such as their interior temperature and humidity.

The transmitting circuit 140 can transmit information to the remote server 110. Communication between the transmitting circuit 140 and the remote server 110 can be achieved using any wired or wireless protocol or protocols, including AMPS, TDMA, CDMA, GSM, GPRS or UMTS. In some embodiments, different types of data may be transmitted via different protocols. In other embodiments, the same types of data may be transmitted via different protocols.

Information about the motion of the container 105 can be transmitted by the transmitting circuit 140 to any other container 105a-105n in a shipment. In some embodiments, the transmitting circuit 140 of each and every container 105a-105n is in communication with the remote server 110. In other embodiments, only a subset of the containers 105a-105n includes transmitting circuits 140 in communication with the remote server 110. For example, a shipment may contain 10 containers 105, only one of which is a "communicator" container equipped with a transmitting circuit 140 capable of communicating with the remote server 110. In this example, information about the "non-communicator" containers 105 must first be transmitted to the "communicator" container via the mesh network 100. The communicator container can then transmit the information to the remote server 110.

Figure 2:
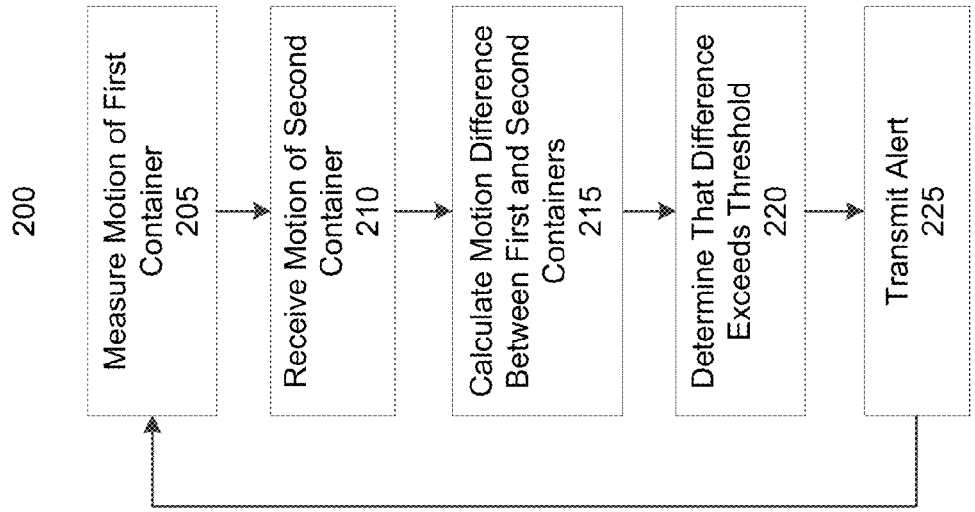
FIG. 2 is a flow diagram depicting the steps performed in one embodiment of a method of determining that a relative difference in motion of at least two containers in a shipment exceeds a predetermined threshold.

Referring now to FIG. 2, a flow diagram depicts the steps performed in one embodiment of a method 200 of determining that a relative difference in motion of at least two containers 105a-105n in a shipment exceeds a predetermined threshold. The method 200 includes the step of measuring, by a computing device fixed to a first container 105a, motion of the first container 105a over an interval of time (step 205). The method 200 includes the step of receiving, by the computing device, information corresponding to motion of a second container 105b over the interval of time (step 210). The method 200 includes the step of calculating, by the computing device, a relative difference between the motion of the first container 105a and the motion of the second container 105b over the interval of time (step 215). The method 200 includes the step of determining that the calculated relative difference in motion of the containers 105a and 105b exceeds a predetermined threshold (step 220). The method 200 includes the step of transmitting, by the computing device to a remote server 110, information corresponding to an alert that the calculated difference exceeds the predetermined threshold, responsive to the determination (step 225).

Referring again to FIG. 2, and in greater detail, a computing device is associated with a first container 105a in a shipment, as discussed above in connection with FIG. 1A-1B. The computing device can be fixed permanently to the container 105a, such that the motion of the computing device is substantially the same as the motion of the container 105a. The computing device measures the motion of the first container 105a over an interval of time. In one embodiment, the computing device includes an accelerometer and the motion of the first container 105a is measured by measuring the acceleration of the container 105a over the interval of time (step 205). In other embodiments, the motion is measured by measuring the position or velocity of container 105a over the interval of time.

The interval of time can be of any duration. In some embodiments, a value of the duration of the time interval is received by the computing device. For example, the data processing circuit 135 can be programmed to store a value corresponding to the duration of the time interval. In another example, the receiving circuit 130 can receive data corresponding to the duration of the time interval, via any wired or wireless communication protocol. In one implementation, the time interval data is received from an owner of the containers. In some embodiments, the motion of the first container 105a can be measured continuously over the time interval. In other embodiments where the motion is measured as a difference in position, the position may be measured once at the beginning of the time interval and measured again at the end of the time interval, and the motion during the time interval can be computed as the difference between these two measurements.

In some embodiments, the sensor 125 measures other information about the first container 105a, in addition to its motion. For example, the computing device can include sensors to measure the temperature and humidity of the interior of container 105a. The additional measurements can be made at times coinciding with the time interval over which the computing device measures the motion of container 105a. In other embodiments, the timing of the additional measurements can be independent of the motion measurement time interval.

The method receiving circuit 130 receives information corresponding to the motion of a second container 105b during the time interval (step 210). This motion information can be received by a computing device associated with the first container 105a. The motion of the second container 105b can be a measure of its position, velocity, or acceleration over the time interval. In some embodiments, the method 200 receives motion information from a plurality of other containers 105b-105n in the shipment.

The receiving circuit 130 can receive other information from the containers 105b-105n. For example, information relating to the temperature or humidity of the containers 105b-105n can be received by the computing device. The computing device can receive the information from other containers 105b-105n via any wired or wireless communication protocol including AMPS, TDMA, CDMA, GSM, GPRS or UMTS. In some embodiments, different types of data may be transmitted via different protocols. In other embodiments, the same types of data may be transmitted via different protocols.

The method 200 includes the step of calculating a relative difference between the motion of the first container 105a and the motion of the second container 105b over the interval of time (step 215). The difference calculation can be performed by the computing device associated with container 105a. For instance, the computing device can perform a comparison operation on the motion information from the first container 105a and the second container 105a. In one implementation, the computing device can receive location information in the form of GPS coordinates for the first container 105a and the second container 105b. The computing device can then subtract the coordinates of the two containers 105a and 105b at the beginning of the interval, and perform a similar subtraction at the end of the interval. In this example, the magnitude of the relative motion difference between the containers 105a and 105b can be represented by the difference of these two subtraction operations.

In some implementations, the computing device of container 105a can receive motion information from two or more other containers 105b-105n. The information can be received wirelessly from the other containers 105b-105n. For example, the containers 105b-105n can transmit information to the first container 105a, to be stored by the data processing circuit 135. The computing device can calculate the difference in motion between any of the containers 105a-105n for which motion data is available. The method 200 calculates the difference using motion information collected from the containers 105b-105n over the same interval of time as was used by the computing device to measure the motion of the first container 105a.

The data processing circuit 135 determines that the motion difference calculated by the computing device (step 215) exceeds a predetermined threshold (step 220). The threshold represents the maximum allowable motion difference of the containers 105a-105n. The calculation can be performed by the data processing circuit 135 by comparing the calculated motion difference to the threshold. This can be done by subtracting the calculated motion difference from the threshold value. If the result of this subtraction is a negative number, then the data processing circuit 135 can determine that the threshold value has been exceeded.

In some implementations, a value for the threshold can be received by the computing device. In one of these implementations, the threshold value can be selected according to known conditions of the configuration of the containers 105a-105n. For example, if all of the containers 105a-105n are to be stored adjacent to each other, the computing device can receive a relatively low threshold value that will be exceeded if one of the containers 105 is removed from the group. In another example, the containers 105a-105n may be stored in a large warehouse. In this example, the computing device could receive a relatively high threshold value, such that the threshold will only be exceeded if one of the containers 105 is removed from the warehouse, but not if any of the containers 105a-105n are relocated inside the warehouse. The value can be received from the owner of the containers, or from the manufacturer of the goods stored in the containers.

The transmitting circuit transmits information corresponding to an alert that the calculated difference exceeds the predetermined threshold (step 225). The alert is transmitted by the computing device to the remote server 110 in response to the determination that the calculated difference in motion exceeds the predetermined threshold. In some implementations, additional information can be included with the alert, such as information identifying the containers 105a-105n whose motion difference triggered the alert, or information about other characteristics of the containers 105a-105n, such as their interior temperature and humidity.

Communication between the transmitting circuit 140 and the remote server 110 can be achieved using any wired or wireless protocol or protocols, including AMPS, TDMA, CDMA, GSM, GPRS or UMTS. In some embodiments, different types of data may be transmitted via different protocols. In other embodiments, the same types of data may be transmitted via different protocols.

In some implementations, the steps of the method 200 can be performed iteratively. Repeating the steps two or more times during a shipment or storage period can allow for continuous monitoring of the relative motion differences of the containers 105a-105n in a shipment. Therefore, the method 200 can be used to implement a potential theft alert system. In some implementations, a number of iterations of the steps of the method 200 to be performed during the course of a shipment can be received by the computing device. In other implementations, the computing device can receive a frequency at which to iterate the steps of method 200.

Figure 3A:
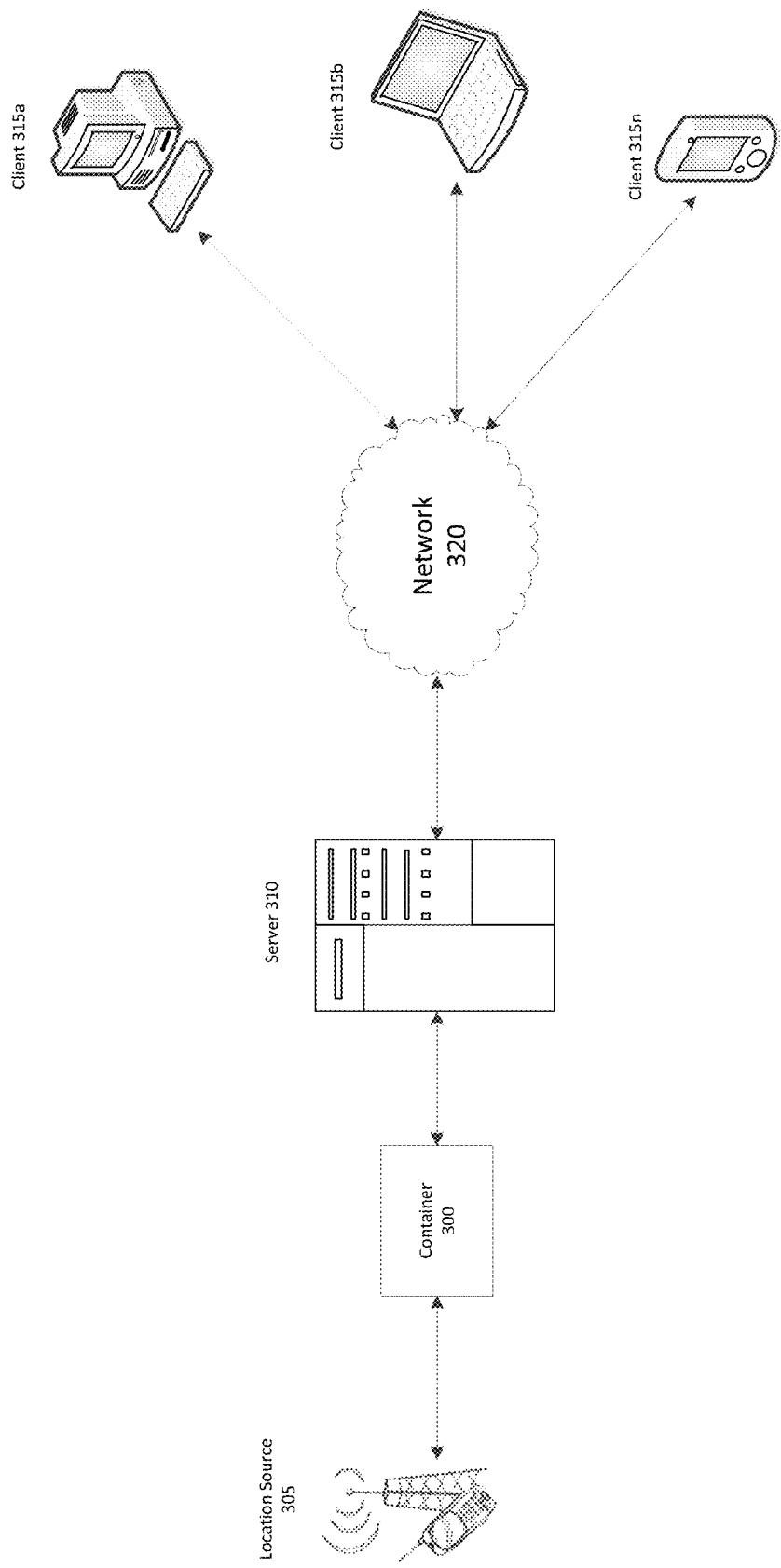
FIG. 3A is a block diagram depicting one embodiment of a network environment for determining a location of a container.

Referring now to FIG. 3A, a block diagram is shown depicting one embodiment of a network environment for determining a location of a container 300. In brief overview, the environment comprises a container 300 receiving information from a location source 305 and transmitting information to a server 310. The server 310 is in communication with client machines 315a-315n, via a network 320.

Referring again to FIG. 3A, and in greater detail, the server 310 and the clients 315a-315n may be geographically dispersed from each other and may communicate over a network 320. The network 320 can be a local-area network (LAN), such as a company Intranet, a metropolitan area network (MAN), or a wide area network (WAN), such as the Internet or the World Wide Web. The network 320 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 320 may comprise a wireless link, such as an infrared channel or satellite band. The topology of the network 320 may be a bus, star, or ring network topology. The network 320 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In one embodiment, the server communicates with the clients via SMS. In some embodiments, different types of data may be transmitted via different protocols. In other embodiments, the same types of data may be transmitted via different protocols.

The server 310 may be referred to as a file server, application server, web server, proxy server, or gateway server. In one embodiment, the server 310 provides functionality of a web server. In some embodiments, the web server 310 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash. or the WebLogic Server products provided by Oracle Corporation of Redwood City, Calif.

The clients 315 may be referred to as client nodes, client machines, endpoint nodes, or endpoints. In some embodiments, a client 315 has the capacity to function as both a client node seeking access to resources provided by a server and as a server providing access to hosted resources for other clients 315a-315n. A client 315 may execute, operate or otherwise provide an application, which can be any type and/or form of software, program, or executable instructions such as any type and/or form of web browser, web-based client, client-server application, an ActiveX control, or a Java applet, or any other type and/or form of executable instructions capable of executing on client 315. The application can use any type of protocol and it can be, for example, an HTTP client, an FTP client, an Oscar client, or a Telnet client. In some embodiments a client 315 may be laptop or desktop computers executing a web browser to display information received from the server 310. In other implementations, a client 315 may be a handheld computing device such as a tablet or smartphone. For example, the client can be a mobile phone receiving information from the server 310 via short message service (SMS).

The client 315 and server 310 may be deployed as and/or executed on any type and form of computing device, such as a computer, network device or appliance capable of communicating on any type and form of network and performing the operations described herein. In some implementations, a client 315 may query the server 310 for information. In other implementations, information from the server 310 is pushed to the client 315 in the absence of a request from the client 315.

The container 300 can be any type of container suitable for shipping or storing goods. In some implementations, the container 300 is an air cargo container. The container 300 can be tracked while it is in storage rather than during a shipment. For example, the container 300 can be a cargo container kept in a warehouse facility. In other examples, the container 300 can be tracked as its location changes, for example during a shipment by plane, ship, or truck. The container 300 can receive information about its location from the location source 305 and can transmit information to the server 300. In some implementations, the container 300 can communicate with the server 310 via short message service (SMS).

The location source 305 can be any device used to determine a location of the container 300 and transmit the location information to the container 300. In some implementations, the location source 305 can comprise more than one physical device. For example, the location source 305 can be a set of communication towers in a cellular network. The cellular towers can determine the location of the container 300 by determining the location of a SIM card 325 associated with the container 300 via triangulation. After the location of the container 300 is identified, the container 300 can receive information about its location from the cellular towers. The towers can communicate with the container 300 using any mobile telephone protocol or protocols, including CDMA or GSM.

In other implementations, the location source 305 can be a series of satellites of a global positioning system (GPS). The GPS satellites can determine a location of the container 300, and can transmit the location information to the container 300 via a wireless communication protocol. In some embodiments, different types of data may be transmitted via different protocols. In other embodiments, the same types of data may be transmitted via different protocols.

Figure 3B:
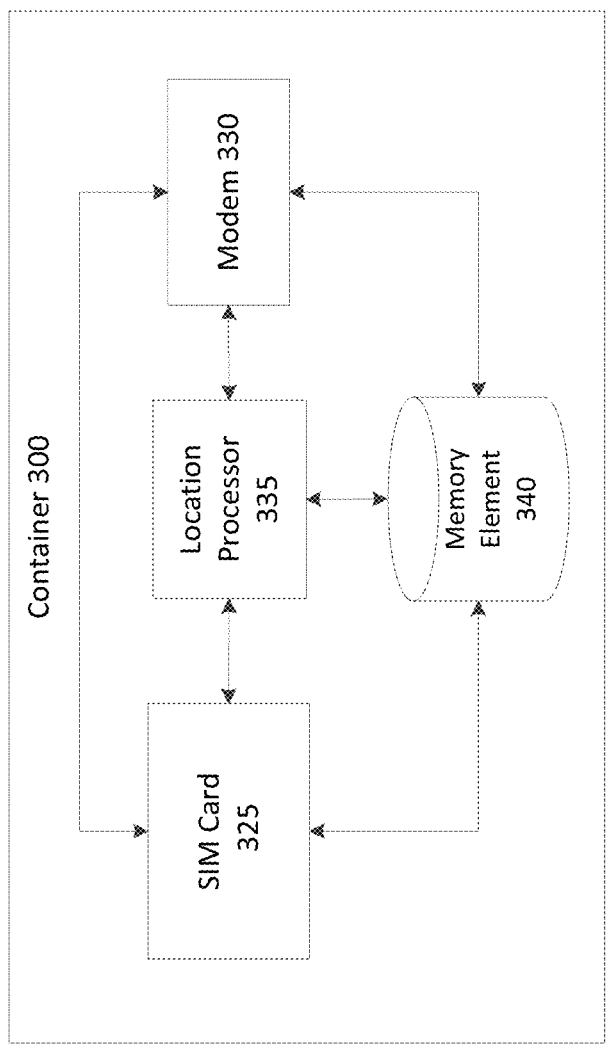
FIG. 3B is an expanded view of a system for determining a location of a container and transmitting the location information to a server.

Referring now to FIG. 3B, an expanded view depicts a system for determining a location of the container 300. In brief overview, the system can contain a SIM card 325, a modem 330, a location processor 335, and a memory element 340.

Still referring to FIG. 3B, and in greater detail, an expanded view of container 300 is shown. The system can include a SIM card 325. The SIM card 325 can be any of any format, including full-size, mini-SIM, micro-SIM, or embedded-SIM. In some embodiments, the SIM card 325 is a machine-to-machine (M2M) SIM card, delivered in a surface mount package. The M2M SIM card can be soldered directly onto a circuit board. In other implementations, the SIM card 325 fits into a connector and is removable and replaceable.

The SIM card is associated with the container 300. In some implementations, the SIM card 325 is fixed to a wall of the container 300. In other implementations, the SIM card 325 can be placed inside the container 300. Information identifying the SIM card 325 is stored on the SIM card 325. The identifying information can identify the SIM card 325 uniquely, or can identify the SIM card 325 as belonging to a group of associated SIM cards. For example, the container 300 can be one container in a shipment of similar containers, and the SIM cards 325 in each container 300 can store information indicating that the SIM cards 325 are associated with each other.

The system can also include a modem 330. The modem 330 receives information corresponding to the location of the SIM card 325. In some implementations, the modem 330 receives the SIM card location information by communicating wirelessly with the location source 305. The modem 330 is also in communication with the SIM card 325, and can retrieve the identification information stored by the SIM card 325. For example, the modem 330 can retrieve the cellular tower identification of the SIM card 325, which can be used to determine the location of the SIM card 325.

In still other implementations, location information can be calculated via cellular tower triangulation. For example, the SIM card 325 can be a machine-to-machine SIM card in communication with a network of cellular towers. By identifying the particular cellular towers communicating with the SIM card 325 and measuring the round-trip time delay of transmissions between the cellular towers and the SIM card 325, the geographic location of the SIM card 325 can be determined. In one of these implementations, the location information of the SIM card 325 is calculated via triangulation, and the modem 330 receives the location information from a mobile location service, such as the location service provided by Locaid Technologies, Inc. of San Francisco, Calif.

After the modem 330 has received the location information and retrieved the SIM card identification information, it can transmit the location and identification information to the remote server 310. This transmission may use any wireless communication protocol. In one implementation, the modem 330 transmits information to the remote server 310 via SMS.

The system can also include a location processor 335. The location processor 335 can receive location information from the location source 305. For example, the location processor 335 can be a GPS processor. In this example, the location source 305 can be a network of GPS satellites. Location information can be acquired by the GPS processor from the GPS satellites.

In another implementation, the location processor 335 can be a cellular baseband processor. The location source 305 can be a series of nearby cellular towers. The location is determined via triangulation and the location processor 335 receives the location information from the cellular towers. In some implementations, the location processor 335 communicates with the modem 330 to relay location information to the modem 330. The modem 330 can then transmit the location information to the remote server 310.

In some implementations, the system also includes a memory element 340. The memory element 340 can be used to store identification information from the SIM card 325 or location information from the modem 330 or the location processor 335. Communication between the memory element 340 and the other system components, such as the SIM Card 325, the modem 330, and the location processor 335 can allow any of the information in the system to be stored for retrieval at a later time. For example, the memory element 340 can be used to store location information from the location processor 335 or directly from the location source 305. Identification information from the SIM card 325 can also be stored in the memory element 340. The modem 330 can later retrieve the information stored in the memory element 340 and transmit the information to the remote server 310. The memory element 340 can be a database, a floppy disk, a hard disk, a CD-ROM, a flash memory card, a PROM, a RAM, a ROM, or a magnetic tape.

Figure 4:
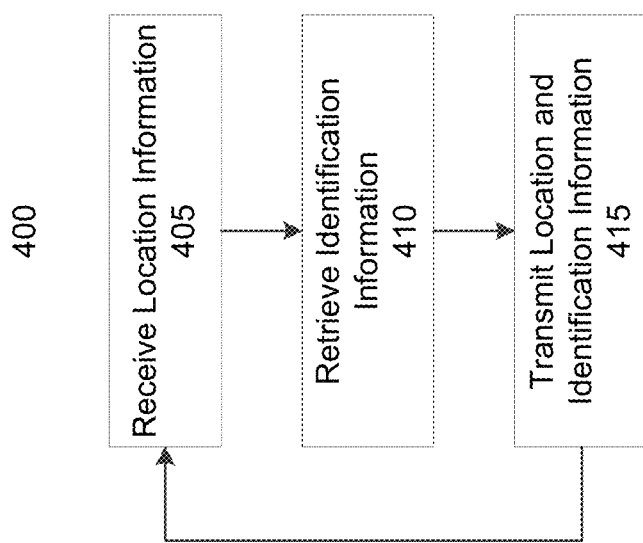
FIG. 4 is a flow diagram depicting the steps performed in one embodiment of a method of determining a location of a container by tracking the location of a subscriber identity module (SIM) card associated with the container.

Referring now to FIG. 4, flow diagram is shown depicting the steps performed in one embodiment of a method 400 of determining a location of a container 300. The method 400 includes the step of receiving, by a modem 330 associated with the container 300 and in communication with the SIM card, information corresponding to the location of the SIM card (step 405). The method 400 includes the step of retrieving, by the modem 330, information from the SIM Card identifying the SIM card (step 410). The method 400 includes the step of transmitting, by the modem 330, the location and identification information of the SIM card to a remote server (step 415).

Referring again to FIG. 4, and in greater detail, a modem 330 and a SIM card 325 are associated with a container 300, as described in FIG. 3B. The modem 330 receives information corresponding to the location of the SIM card 325 (step 405). In some implementations, the modem 330 receives the location information from a location source 305, as shown in FIG. 3A. The location source 305 can be cellular towers or GPS satellites in communication with the SIM card 325 and the modem 330.

In other implementations, the modem 330 can receive the location information from a location processor associated with the container 300. For example, the location processor can be a cellular baseband processor, a GPS processor, or any other circuit capable of processing location information from a location source 305. In some implementations, the location information is determined by the location processor in communication with a location source 305. After the location data is determined or received by the location processor, it can then received by the modem 330 from the location processor via wired or wireless communication protocols.

In still other implementations, the modem 330 can retrieve cellular tower identification information from the SIM Card 325. Using the cellular tower identification information, the modem 330 can determine the geographic location of the SIM card 325 based on the known location of the cellular tower closest to the SIM card 325. Location information can also be calculated via cellular tower triangulation. For example, the SIM card 325 can be a machine-to-machine SIM card in communication with a network of cellular towers. Triangulation can be used to determine the location of the SIM card 325, as described above in connection with FIG. 3B. The modem 330 can receive the location information from a mobile location service, such as the location service provided by Locaid Technologies, Inc. of San Francisco, Calif.

In yet other implementations, the modem 330 can receive or retrieve the location information from a memory element associated with the container 300. Location information can be stored in the memory element either from the location source 305 or from the location processor. The memory element can store the location information permanently or temporarily, and the modem 330 can receive the location information from the memory element at any time subsequent to the storage of the information in the memory element.

The method 400 also retrieves, by the modem 330, information from the SIM card 325 identifying the SIM card 325 (step 410). Identification information can include a serial number or manufacturer of the SIM card 325, or information identifying the container 300 associated with the SIM card 325, such as the contents of the container 300 or its intended destination. In some implementations, the modem 330 receives the identification information directly from the SIM card 325. In other implementations, the SIM card 325 identification information can be stored in a memory element, and the modem 330 can retrieve the identification information from the memory element.

The method also transmits, by the modem 330, the location and identification information of the SIM card 325 to a remote server (step 415). The modem 330 can transmit the information to the server using any form of wireless communication. In one implementation, the modem 330 transmits the information via SMS.

The information transmitted by the modem 330 can include additional information about the SIM card 325 or the container 300. For example, the modem 330 can transmit information regarding an environmental condition inside the container 300, such as temperature or humidity. The modem 330 may also transmit information about a condition of the goods stored inside the container 300, or a presence or absence of such goods.

In some implementations, the steps of the method 400 can be iterated one or more times during a shipment of the containers 300. Iterating the steps can allow the information to be continuously monitored so that location or environmental conditions of the container 300 can be tracked. In some implementations the system can receive a number of times to iterate the steps of the method 400 during a time period. For example, this number could be stored in the memory element described in connection with FIG. 3B.

Figure 5:
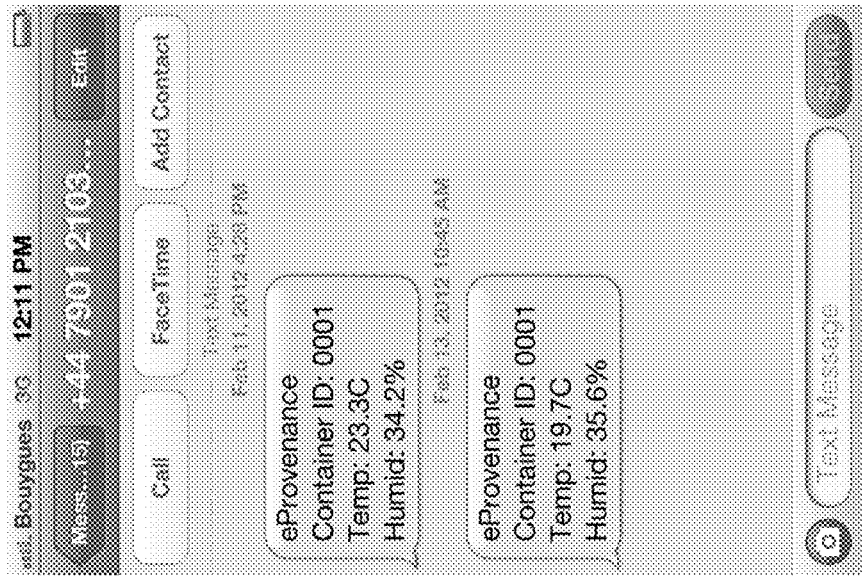
FIG. 5 is a screenshot of a user interface for receiving information about the location, temperature, and humidity of a container.

Referring now to FIG. 5, a screenshot depicts a user interface 500 for receiving information about the location, temperature, and humidity of a container 300 via short message service (SMS). The user interface 500 can be displayed on the client machines described in connection with FIG. 1A or FIG. 3A. In one implementation, the data to be displayed by the user interface 500 can include a serial number of the container 300, an interior temperature of the container 300, an interior humidity level of the container 300, a location of the container 300, or an alert that the relative difference between the container 300 and other containers 300 in a shipment exceeds a predetermined threshold. The user interface 500 can display a record of data received at consecutive intervals, allowing the user to track the location or environmental conditions of the container 300 over a period of time. In one embodiment, the user interface 500 can be displayed on a handheld mobile device.

Figure 6:
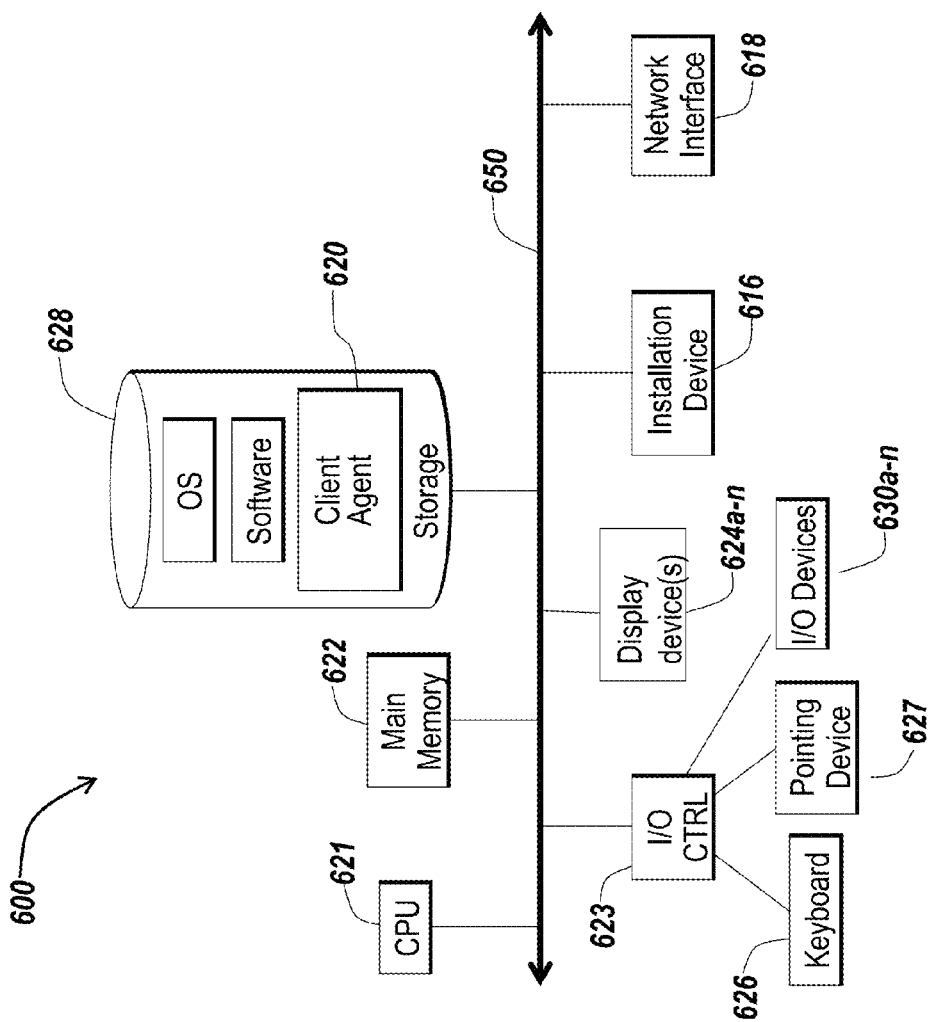
FIG. 6 is a block diagram depicting one embodiment of a computing device useful in connection with the methods and systems described herein.

FIG. 6 depicts a block diagram of a computing device 600 useful for practicing an embodiment of the clients 115a-115n and 315a-315n, servers 110 and 310, data processing circuit 135, or location processor 335. As shown in FIG. 6, each computing device 600 includes a central processing unit 621, and a main memory unit 622. As shown in FIG. 6, a computing device 600 may include a visual display device 624, a keyboard 626 and/or a pointing device 627, such as a mouse.

The central processing unit 621 is any logic circuitry that responds to and processes instructions fetched from the main memory unit 622. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 600 may be based on any of these processors, or any other processor capable of operating as described herein.

The computing device 600 may include a network interface 618 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 618 may comprise a built-in network adapter, network interface card, PCMCIA network card, card bus network adapter, wireless network adapter, USB network adapter, modem or any other device suitable for interfacing the computing device 600 to any type of network capable of communication and performing the operations described herein.

A wide variety of I/O devices 630a-630n may be present in the computing device 600. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 623 as shown in FIG. 6. The I/O controller may control one or more I/O devices such as a keyboard 626 and a pointing device 627, e.g., a mouse or optical pen. Furthermore, an I/O device may also provide storage and/or an installation medium 616 for the computing device 600. In still other embodiments, the computing device 600 may provide USB connections to receive handheld USB storage devices such as the USB Flash Drive line of devices manufactured by Twintech Industry, Inc. of Los Alamitos, Calif.

In some embodiments, the computing device 600 may comprise or be connected to multiple display devices 624a-624n, which each may be of the same or different type and/or form. As such, any of the I/O devices 630a-630n and/or the I/O controller 623 may comprise any type and/or form of suitable hardware, software, or combination of hardware and software to support, enable or provide for the connection and use of multiple display devices 624a-624n by the computing device 600. For example, the computing device 600 may include any type and/or form of video adapter, video card, driver, and/or library to interface, communicate, connect or otherwise use the display devices 624a-624n. In one embodiment, a video adapter may comprise multiple connectors to interface to multiple display devices 624a-624n. In other embodiments, the computing device 600 may include multiple video adapters, with each video adapter connected to one or more of the display devices 624a-624n. In some embodiments, any portion of the operating system of the computing device 600 may be configured for using multiple displays 624a-624n. In other embodiments, one or more of the display devices 624a-624n may be provided by one or more other computing devices, such as computing devices 600a and 600b connected to the computing device 600, for example, via a network. These embodiments may include any type of software designed and constructed to use another computer's display device as a second display device 624a for the computing device 600. One ordinarily skilled in the art will recognize and appreciate the various ways and embodiments that a computing device 600 may be configured to have multiple display devices 624a-624n.

In further embodiments, an I/O device 630 may be a bridge between the system bus 650 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 600 of the sort depicted in FIG. 6 typically operates under the control of operating systems, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others. A server 110 and a client 115 may be heterogeneous, executing different operating systems.

In some embodiments the computing device 600 is a mobile device, such as a JAVA-enabled cellular telephone or personal digital assistant (PDA), such as the i55sr, i58sr, i85s, i88s, i90c, i95cl, or the iM1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In other embodiments, the computing device 600 is a Blackberry handheld or smart phone, such as the devices manufactured by Research In Motion Limited, including the Blackberry 7100 series, 8700 series, 7700 series, 7200 series, the Blackberry 7520, or the Blackberry PEARL 8100. In yet other embodiments, the computing device 600 is a smart phone, Pocket PC, Pocket PC Phone, or other handheld mobile device supporting Microsoft Windows Mobile Software. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 600 comprises a combination of devices, such as a mobile phone combined with a digital audio player or portable media player. In one of these embodiments, the computing device 600 is an iPhone smartphone, manufactured by Apple Computer of Cupertino, Calif.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Figure 7:
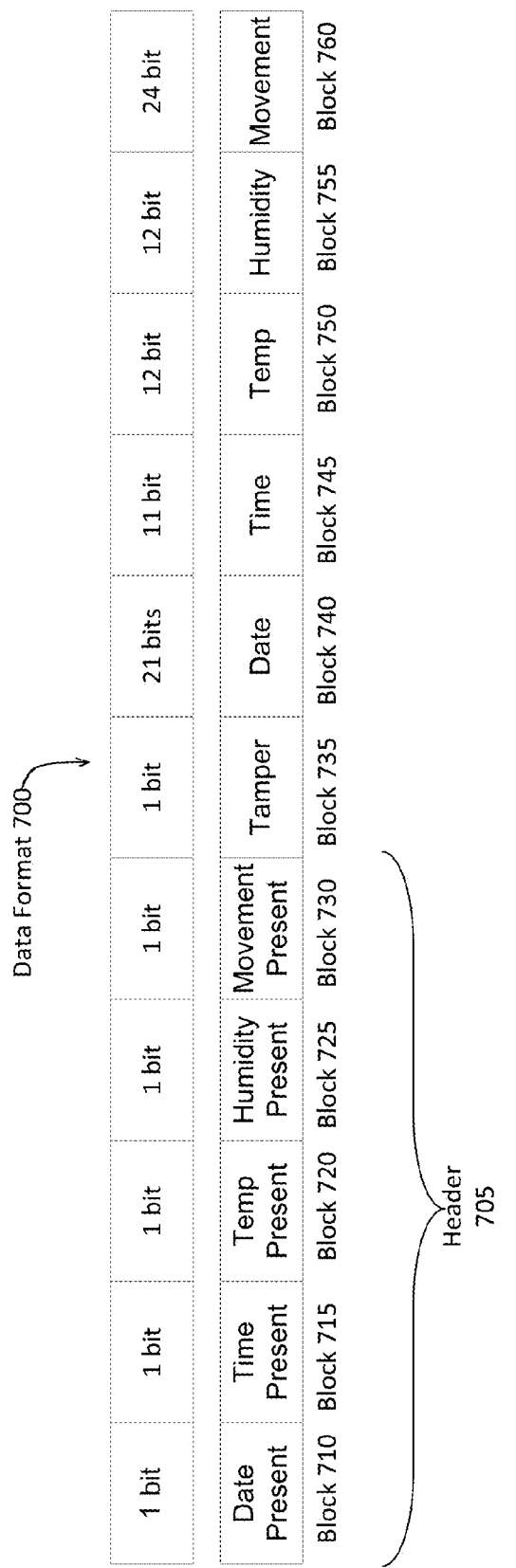
FIG. 7 is a block diagram depicting one embodiment of a data storage format useful in connection with the methods and systems described herein.

Referring now to FIG. 7, a block diagram is shown depicting one embodiment of a data storage and transmission format 700 useful for practicing the systems described above in FIG. 1B and FIG. 3B. In brief overview, FIG. 7 shows an example of a binary data storage and transmission format 700 for storing and transmitting data related to the date, time, temperature, humidity, movement, and tamper alert for the containers 105 and 300.

Still referring to FIG. 7, and in greater detail, the data format 700 includes a 5-bit header 705. Each bit in the header 705 indicates the presence or absence of a category of data in data format 700. The header 705 includes bit positions indicating the availability of data corresponding to a date (Block 710), a time (Block 715), a temperature (Block 720), a humidity (Block 725), and movement (Block 730). A value of '1' in a bit position can indicate the presence of data for the category of that position, while a value of '0' can indicate that no data is available for that category. For example, when there is temperature information available in data format 700, the temperature position (Block 720) in the header 705 can have a value of '1'.

The data format 700 can also include a 1-bit tamper indication (Block 735). The tamper bit can indicate an unauthorized opening or relocation of the container 105 or 300. A value of '1' can correspond to a potential tamper indication and a value of '0' can indicate that no tampering has been detected. In some implementations, the tamper bit can be set in response to a determination that the relative difference in motion of two containers 105a and 105b has exceeded a predetermined threshold, as described above in connection with FIG. 1A, FIG. 1B, and FIG. 2.

The data format 700 can also include data blocks storing information corresponding to a date (Block 740) and a time (Block 745). In some implementations, the date and time stored in these blocks can represent the date and time at which the other data were collected. In other implementations, the date and time can represent the time at which the data stored in data format 700 was transmitted, for example to server 110 or server 310.

The date block 740 has a size of 21 bits. In some implementations, the date block 740 can store values indicating the year, month, and day of the date to be represented. In other implementations, the date block 740 can store an integer value representing the number of days that have elapsed from a reference date (e.g. Dec. 31, 1970). The time block 745 can have a size of 11 bits and can store a current time of day. In some implementations, the data stored in the date block 740 and the time block 745 can be determined by a clock associated with the containers 105 or 300. In other implementations, the date and time information can be received from an external timing source, such as GPS. For example, the date and time information can be received by the receiving circuit 130 or by the modem 330.

The data format 700 can also include data blocks used to store environmental conditions of the containers 105 and 300. For example, the data format 700 can contain a 12-bit data block for storing temperature information (Block 750) and a 12-bit data block for storing humidity information (Block 755). The temperature and humidity information can indicate a environmental conditions inside the container 105 or 300, allowing a manufacturer of environmentally sensitive goods to keep a record of the shipping or storage conditions of the goods. In some implementations, the temperature and humidity information to be stored in Block 745 and Block 750, respectively, can be measured by sensors associated with the containers 105 and 300.

The data format 700 can also include a 24-bit data block containing movement information for the container 105 or 310 (Block 760). In some implementations, the movement information stored in Block 760 can represent the total movement of container 105 or 300 over a time interval, as described in connection with FIG. 1B and FIG. 3B above. For example, the sensor 125 can measure movement over the time interval and the movement information can be recorded or transmitted as part of data format 700. In another example, the movement information to be stored in Block 760 can be determined by the location processor 335 of FIG. 3B over the interval of time. In other implementations, the movement information can indicate the total change in position, velocity, or acceleration experienced by the container 105 or 300 since it left its destination.

Data format 700 can be used to store or transmit information for the container 105 or 300. For example, the data processing circuit 135 can arrange the data for container 105 in accordance with data format 700. The data can then be stored by the data processing circuit 135, or transmitted to the server 110 by the transmitting circuit 140. In another example, the memory element 340 may store information in the format of data format 700. The modem 330 can then retrieve this data from the memory element 340, and transmit the data to the server 310.

Having described certain embodiments of methods and systems for securing chattels, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for determining a location of a container by tracking the location of a subscriber identity module (SIM) card associated with the container, the method comprising:
   receiving, by a location processor associated with the container, location information from at least one location source comprising a set of communication towers in a cellular network;
   receiving a cellular tower identifier from one of the communication towers;
   storing the cellular tower identifier on the SIM card;
   determining, by the location processor, the location of the SIM card based on the cellular tower identifier stored on the SIM card;
   receiving, by a modem associated with the container, information corresponding to the location of the SIM card from the location processor;
   retrieving, by the modem, identification information from the SIM card, the identification information identifying the SIM card and indicating that the SIM card is associated with one or more additional SIM cards, wherein each of the additional SIM cards is associated with a respective additional container;
   retrieving, by the modem, information regarding at least one environmental condition in the container;
   retrieving, by the modem, information regarding a condition of goods within the container; and
   transmitting, by the modem, the location information, the identification information, the information regarding the at least one environmental condition in the container, and the information regarding the condition of goods within the container to a remote server via short message service (SMS).

2. The method of claim 1, wherein the at least one location source comprises a set of communication towers in a cellular network, and wherein the method further comprises calculating the location of the SIM card using cellular tower triangulation.

3. The method of claim 1, wherein the at least one location source further comprises a series of satellites of a global positioning system, and wherein the method further comprises calculating, by the location processor, the location of the SIM card using information received from the global positioning system.

4. The method of claim 1, further comprising the step of iterating the receiving, retrieving, and transmitting steps one or more times during shipment of the container.

5. The method of claim 4, further comprising receiving, by a memory element, a number of iterations to be performed during shipment.

6. A system for determining the location of a container, the system comprising:
   at least one location source external to the container, the at least one location source comprising a set of communication towers in a cellular network;
   a SIM card associated with the container, the SIM card storing information identifying the SIM card and indicating that the SIM card is associated with one or more additional SIM cards, wherein each of the additional SIM cards is associated with a respective additional container;
   a location processor associated with the container, the location processor:
      receiving a cellular tower identifier from one of the communication towers;
      storing the cellular tower identifier on the SIM card;
      determining the location of the SIM card based on the cellular tower identifier stored on the SIM card the location information received from the at least one location source;
   a sensor for determining at least one environmental condition in the container;
   a modem associated with the container and in communication with the SIM card, the modem:
      receiving the information corresponding to the location of the SIM card;
      retrieving the information identifying the SIM card;
      retrieving information corresponding to the at least one environmental condition in the container;
      retrieving information regarding a condition of goods within the container; and
      transmitting the location information, the identification information, the information regarding the at least one environmental condition in the container, and the information regarding the condition of goods within the container to a remote server via short message service (SMS).

7. The system of claim 6, further comprising a memory element storing the identification information of the SIM card.

8. The system of claim 6, wherein:
   the location processor comprises a global positioning system (GPS) processor in communication with the modem;
   the at least one location source further comprises a series of satellites of a GPS system; and
   the GPS processor acquires the location information from GPS satellites.

9. The system of claim 6, wherein:
the location processor comprises a cellular baseband processor in communication with the modem; and
the cellular baseband processor acquires the location information from the set of communication towers.

* * * * *